(12) United States Patent
Zhou

(10) Patent No.: US 12,326,755 B2
(45) Date of Patent: Jun. 10, 2025

(54) DISPLAY MODULE AND ELECTRONIC DEVICE

(71) Applicant: VIVO MOBILE COMMUNICATION CO., LTD., Dongguan (CN)

(72) Inventor: Ziji Zhou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 244 days.

(21) Appl. No.: 18/140,611

(22) Filed: Apr. 27, 2023

(65) Prior Publication Data

US 2023/0266793 A1 Aug. 24, 2023

Related U.S. Application Data

(63) Continuation of application No. PCT/CN2021/126117, filed on Oct. 25, 2021.

(30) Foreign Application Priority Data

Oct. 30, 2020 (CN) .......................... 202011187160.3

(51) Int. Cl.
*G06F 1/16* (2006.01)
*H04M 1/02* (2006.01)

(52) U.S. Cl.
CPC .......... *G06F 1/1616* (2013.01); *G06F 1/1686* (2013.01); *H04M 1/0214* (2013.01); *H04M 1/0264* (2013.01)

(58) Field of Classification Search
CPC .... G06F 1/1616; G06F 1/1686; G06F 1/1681; H05K 5/0017; F16M 11/06
See application file for complete search history.

(56) References Cited

U.S. PATENT DOCUMENTS 8,711,566 B2 * 4/2014 O'Brien ................ G06F 1/1652
361/724
10,499,515 B2 * 12/2019 Lee ....................... G06F 1/1624
(Continued)

FOREIGN PATENT DOCUMENTS

CN 203796733 U 8/2014
CN 105528035 A 4/2016
(Continued)

OTHER PUBLICATIONS

International Search Report issued in corresponding International Application No. PCT/CN2021/126117, mailed Jan. 27, 2022, 6 pages.
(Continued)

*Primary Examiner* — Abhishek M Rathod
(74) *Attorney, Agent, or Firm* — IPX PLLC

(57) ABSTRACT

A display module and an electronic device are disclosed. The display module includes a first screen, a second screen, a drive assembly, a first transmission assembly, and a second transmission assembly. The first screen is connected to the second screen. The first screen and the second screen are configured to rotate relative to each other. The first transmission assembly is at least partially connected to the first screen; and the second transmission assembly is at least partially connected to the second screen, where the first transmission gear assembly is configured to move in a first plane, the second transmission gear assembly is configured to move in a second plane, the first plane and the second plane are orthogonal to each other. The drive assembly is configured to drive the first transmission gear assembly to rotate, so that the second screen rotates relative to the first screen.

14 Claims, 10 Drawing Sheets

(56) References Cited

U.S. PATENT DOCUMENTS

| | | | | |
|---|---|---|---|---|
| 10,747,269 B1* | 8/2020 | Choi | .................... | G06F 1/1652 |
| 11,051,413 B2* | 6/2021 | Yang | .................... | G06F 1/1624 |
| 11,144,102 B2* | 10/2021 | Kim | .................... | G06F 1/1652 |
| 2017/0192459 A1* | 7/2017 | Zhang | .................... | G06F 1/1652 |
| 2018/0058665 A1 | 3/2018 | Endo | | |
| 2020/0033913 A1* | 1/2020 | Yang | .................. | H04M 1/0268 |
| 2021/0373603 A1* | 12/2021 | Feng | .................... | G06F 1/1624 |

FOREIGN PATENT DOCUMENTS

| | | | |
|---|---|---|---|
| CN | 106155212 A | 11/2016 | |
| CN | 111219408 A | 6/2020 | |
| CN | 112303421 A | 2/2021 | |
| KR | 20060099671 A | 9/2006 | |
| KR | 20070093518 A | 9/2007 | |
| KR | 100771280 B1 | 10/2007 | |

OTHER PUBLICATIONS

First Office Action issued in related Chinese Application No. 202011187160.3 , mailed Dec. 2, 2021, 7 pages.
Second Office Action issued in related Chinese Application No. 202011187160.3, mailed May 27, 2022, 9 pages.

\* cited by examiner

A-A

A-A

DISPLAY MODULE AND ELECTRONIC DEVICE

CROSS-REFERENCE TO RELATED APPLICATIONS

This application is a continuation of International Application No. PCT/CN2021/126117, filed Oct. 25, 2021, which claims priority to Chinese Patent Application No. 202011187160.3, filed Oct. 30, 2020. The entire contents of each of the above-referenced applications are expressly incorporated herein by reference.

TECHNICAL FIELD

The present application relates to the field of display technologies, and in particular to a display module and an electronic device.

BACKGROUND

Most existing flexible folding screens are designed to be bent inwards or outwards, but folding and unfolding methods of this kind of folding screen requires manual folding or unfolding, that is, manual pressing on the screen to unfold it. Because the folding screen is relatively fragile, multiple times of unfolding in the long term is a great test for the life of the screen. Moreover, when the hinge is folded multiple times, it may become loose, and therefore the second screen may naturally sag after unfolding. As a result, the surfaces of the screens are not on the same plane. In addition, since manual leveling is required every time, a user does not have a strong sense of technology and the experience is not good.

SUMMARY

Embodiments of the present application provide a display module and an electronic device.

In a first aspect, the embodiments of the present application provide a display module, including a first screen, a second screen, a drive assembly, a first transmission assembly, and a second transmission assembly, where the first screen is connected to the second screen and the first screen and the second screen can rotate relative to each other;
  the first transmission assembly is at least partially connected to the first screen, the first transmission assembly includes a first transmission gear assembly and a first transmission rack, and the first transmission rack is provided with a first meshing teeth, and the first transmission gear assembly meshes with the first meshing teeth;
  the second transmission assembly is at least partially connected to the second screen, the second transmission assembly includes a second transmission gear assembly and a second transmission rack, the second transmission rack is provided with a second meshing teeth, the second transmission gear assembly meshes with the second meshing teeth, and the first transmission rack is connected to the second transmission rack, where the first transmission gear assembly moves in a first plane, and the second transmission gear assembly moves in a second plane, and the first plane and the second plane are orthogonal to each other; and
  the drive assembly drives the first transmission gear assembly to rotate, so that the second screen rotates relative to the first screen.

In some embodiments, a camera module is also included, and the camera module is arranged on the first screen or the second screen. The embodiments of the second aspect of the present application also provide an electronic device, which includes the display module described in any one of the above implementations.

In some embodiments, the electronic device also includes:
  a control module, where the control module is electrically connected to a drive motor of the drive assembly, and is configured to: when the electronic device receives an input for controlling the first screen and/or the second screen to unfold or fold, control, according to the input, the drive motor to start, to implement the unfolding or folding of the first screen and/or the second screen.

In the embodiments of the present application, by using the drive assembly to drive the display screen to automatically fold and unfold without manual operation, it is more convenient for the user to unfold or fold the display screen. It can also ensure the consistency of the screen after each unfolding or folding, which improves the user's experience of unfolding the second screen.

DETAILED DESCRIPTION

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

The term "comprise/include" and any other variants in the description and the claims of this application mean to cover the non-exclusive inclusion, for example, a process, method, system, product, or device that includes a list of steps or units and is not necessarily limited to those steps or units, but may include other steps or units not expressly listed or inherent to such a process, method, product, or device. In addition, "and/or" used in the description and the claims means at least one of the connected objects. For example, A and/or B represent the following three cases: Only A exists, only B exists, and both A and B exist.

In the embodiments of the present application, the word such as "example" or "for example" is used to represent giving an example, an illustration, or a description. Any embodiment or design solution described as "exemplary" or "for example" in the embodiments of the present application should not be construed as being more preferred or advantageous than other embodiments or design solutions. To be precise, the use of the term such as "exemplary" or "for example" is intended to present a related concept in a specific manner.

The embodiments of the present application are described below in conjunction with the accompanying drawings.

Figure 1:
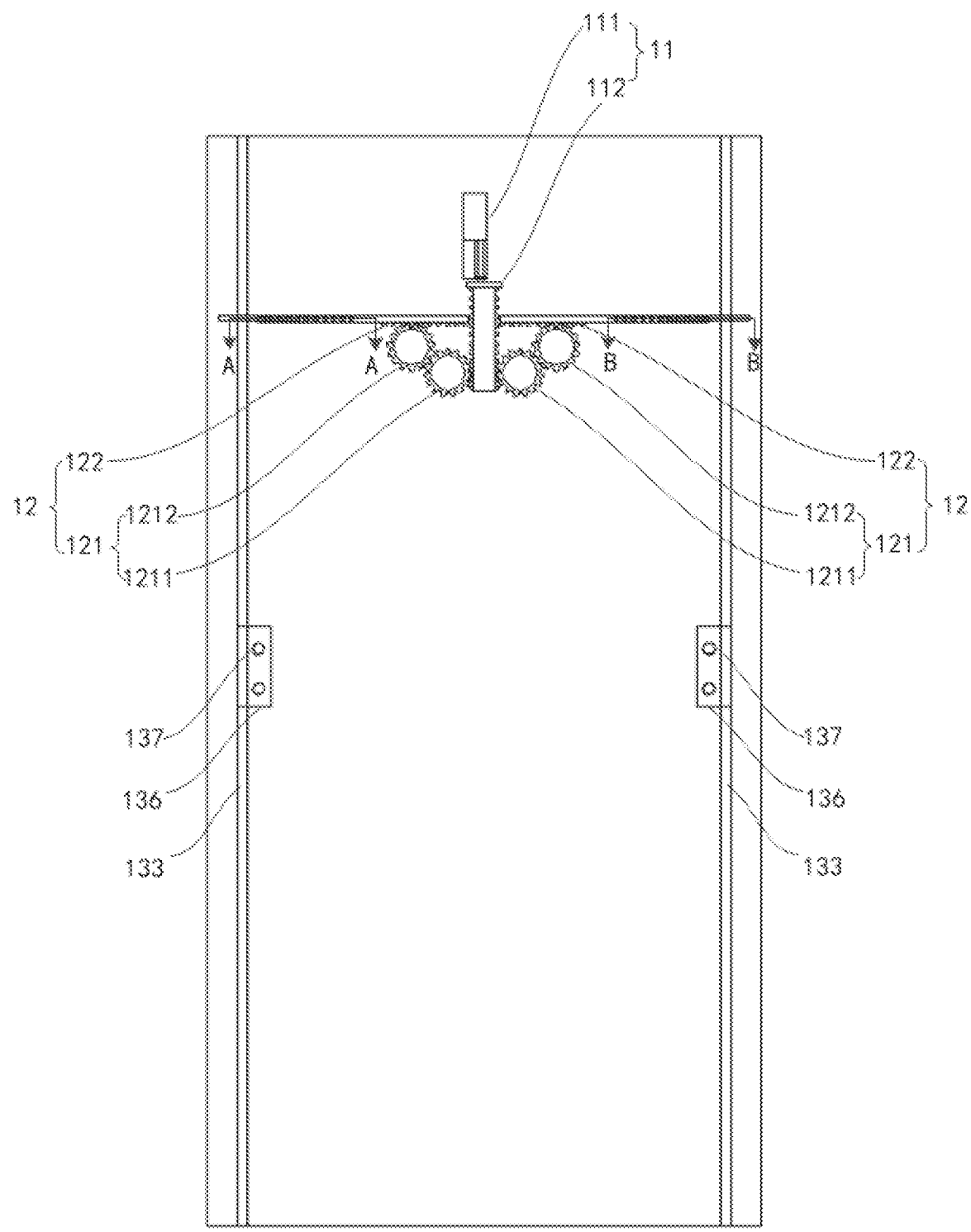
FIG. 1 is a schematic structural diagram of a display module according to an embodiment of the present application.
Figure 2:
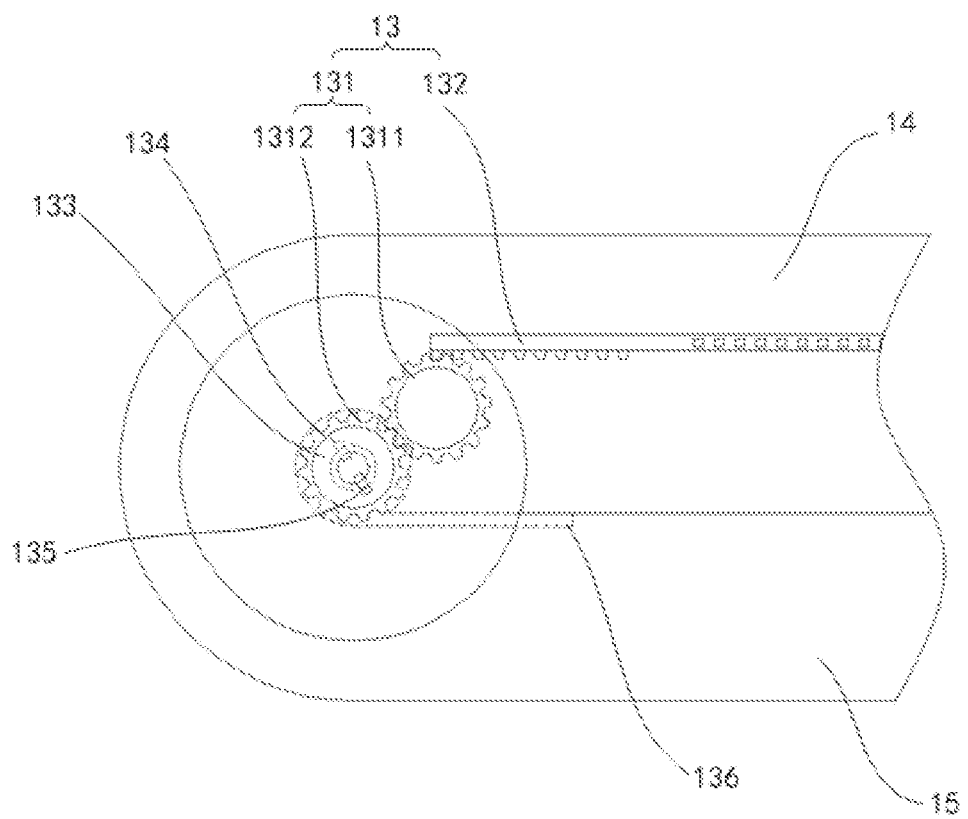
FIG. 2 is a schematic sectional view along A-A in FIG. 1.

Referring to FIG. 1 and FIG. 2, where FIG. 1 is a schematic structural diagram of a display module according to an embodiment of the present application, and FIG. 2 is a schematic sectional view along A-A in FIG. 1. As shown in FIG. 1 and FIG. 2, the display module in the embodiment of the application includes a first screen 14, a second screen 15, a drive assembly 11, a first transmission assembly 12, and a second transmission assembly 13, where the first screen 14 is connected to the second screen 15 and the first screen and the second screen can rotate relative to each other. In some embodiments, the first transmission assembly 12 is at least partially connected to the first screen 14, the first transmission assembly 12 includes a first transmission gear assembly 121 and a first transmission rack 122, the first transmission rack 122 is provided with a first meshing tooth, and the first transmission gear assembly 121 meshes with the first meshing tooth for transmission. The second transmission assembly 13 is at least partially connected to the second screen 15, the second transmission assembly 13 includes a second transmission gear assembly 131 and a second transmission rack 132, the second transmission rack 132 is provided with a second meshing tooth, and the second transmission gear assembly 131 meshes with the second meshing tooth for transmission. The first transmission rack 122 and the second transmission rack 132 are connected and both are in the same straight line. In some embodiments, the first transmission rack 122 and the second transmission rack 132 can be designed as an integral structure. In addition, the first transmission gear assembly 121 moves in the first plane, the second transmission gear assembly moves in the second plane, and the first plane is orthogonal to the second plane, that is, the rotation plane of the first transmission gear assembly 121 is in the first plane, and the rotation plane of the second transmission gear assembly is in the second plane. The drive assembly 11 is configured to drive the first transmission gear assembly 121, so that the second screen 15 rotates relative to the first screen 14. That is, the drive assembly 11 drives the first transmission gear assembly 121, and the first transmission gear assembly 121 meshes with the first transmission rack 122, while the first transmission rack 122 is connected to the second transmission rack 132, and the second transmission rack 132 further meshes with the second transmission gear assembly 131. Through transmission of the foregoing transmission mechanism, the second screen 15 is driven to rotate relative to the first screen 14, thereby realizing the automatic unfolding or folding of the second screen 15, and ensuring the consistency of the screen after each unfolding or folding, thus improving the user experience.

In some embodiments, the first plane may refer to a plane where the first screen 14 is located, and the second plane is orthogonal to the first screen 14 and orthogonal to the second screen 15.

Figure 3:
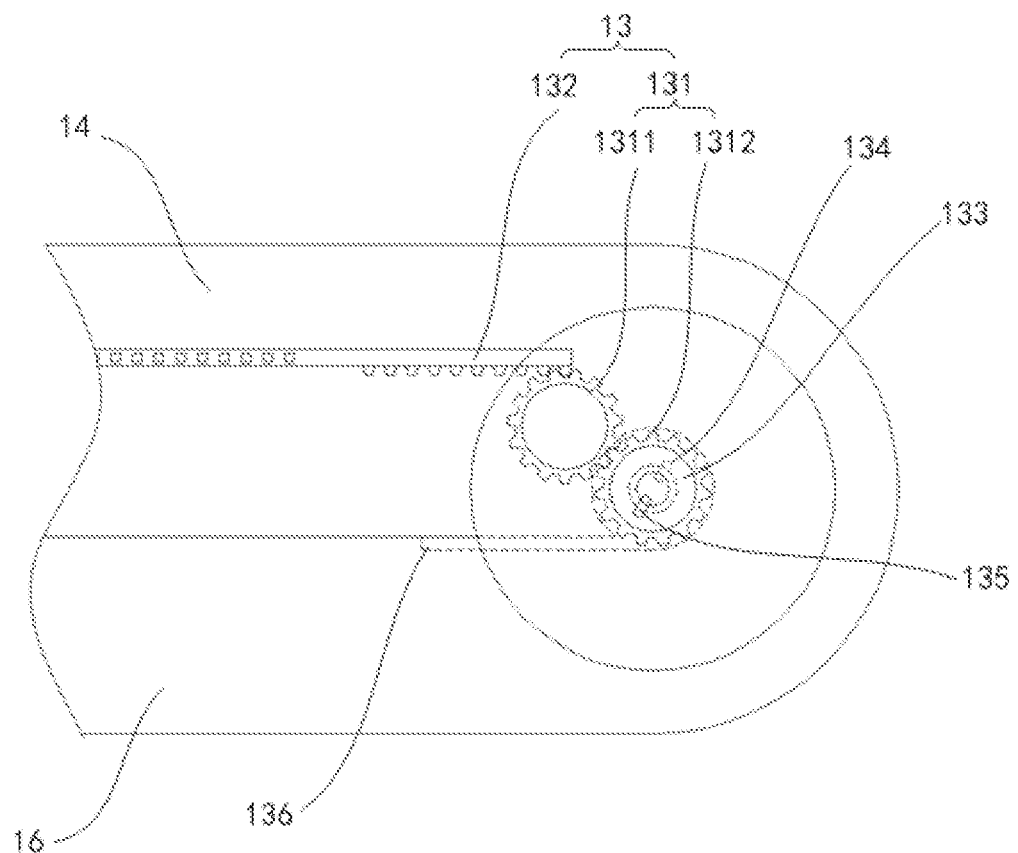
FIG. 3 is a schematic sectional view along B-B in FIG. 1.

Referring to FIG. 3, which is a schematic sectional view along B-B in FIG. 1. As shown in FIG. 1 and FIG. 3, in the embodiment of the present application, the display module can also include a third screen 16. To implement the rotation of the second screen and the third screen 16 relative to the first screen 14, the number of first transmission assemblies 12 and the number of second transmission assemblies 13 are both two, the two first transmission assemblies 12 are at least partially connected to the first screen 14, one second transmission assembly 13 is at least partially connected to the second screen 15, the other second transmission assembly 13 is at least partly connected to the third screen 16, and the drive assembly 11 can drive the two first transmission gear assemblies 121 to rotate, so that the second screen 15 and the third screen 16 rotate relative to the first screen 14. The connection between the second screen 15 and the first screen 14 is described above, for the connection between the third screen 16 and the first screen 14, refer to the connection between the second screen 15 and the first screen 14, and the second screen 15 and the third screen 16 can be arranged on two sides of the first screen 14, for example, arranged symmetrically. In some embodiments, the first screen 14 can be set as a screen commonly used by a user, that is, located on the front of the electronic device, and the second screen and/or the third screen 16 can be set on a side of the first screen 14. For example, when the first screen 14 is rectangular, the second screen 15 and the third screen 16 could be rotatably connected to two long sides of the first screen 14 respectively, and when the second screen 15 and the third screen 16 are both unfolded, the second screen 15 and the third screen 16 are displayed together with the first screen 14, providing a user with a larger display area to display more display content. When the second screen 15 and/or the third screen 16 is folded, the size of the electronic device is reduced, to facilitate carrying and hand-holding operations.

In some embodiments of the present application, the drive assembly 11 may include a drive motor 111 and a gear push rod 112, the gear push rod 112 is in transmission connection with the first transmission assembly 12, and the drive motor 111 is configured to drive the gear push rod 112 to move along a first straight line, to transmit power to the first transmission assembly 12, that is, a drive shaft of the drive motor 111 is connected to the gear push rod 112, and the drive motor 111 can drive the gear push rod 112 to move along the first straight line in the first plane. The gear push rod 112 is provided with a third meshing tooth, and the first transmission gear assembly 121 meshes with the third meshing tooth, so that the gear push rod 112 drives the first transmission assembly 12 in transmission connection with the gear push rod 112, to perform power transmission. In the embodiment of the present application, the first straight line may be parallel to an intersection line of the first screen 14 and the second screen 15.

In the embodiment of the present application, the first transmission gear assembly 121 includes a first gear 1211 and a second gear 1212. The first gear 1211 and the second gear 1212 meshes with each other for transmission, the first gear 1211 further meshes with the third meshing tooth on the gear push rod 112 for transmission, and the second gear 1212 further meshes with the first meshing tooth on the first transmission rack 122 for transmission, so that when the drive motor 111 drives the gear push rod 112 to move along the first straight line, through meshing transmission between the third meshing tooth, the first gear 1211, the second gear 1212, the first meshing teeth, and other components, the second transmission rack 132 connected to the first transmission rack 122 moves in a straight line perpendicular to the first straight line in the first plane.

In the embodiment of the present application, the second transmission gear assembly 131 includes a third gear 1311 and a fourth gear 1312, the third gear 1311 and the fourth gear 1312 mesh with each other for transmission, and the third gear 1311 further meshes with the second meshing tooth on the second transmission rack 132 for transmission, so that through the meshing transmission between the second meshing tooth, the third gear 1311, the fourth gear 1312, and other components, the second screen 15 and/or the third screen 16 connected to the second transmission assembly 13 rotates relative to the first screen 14.

In some embodiments, the number of gears in the first transmission gear assembly 121 and the second transmission gear assembly 131 may be two as described above, or may be more than two, and meshing transmission of multiple gears can reduce the diameter of a single gear. It should be noted that, in the case of at least two gears, the transmission ratios between two adjacent gears can be the same or different, and the specific selection depends on factors such as different moving speeds and structural stability.

As shown in FIG. 2 and FIG. 3, the display module also includes a rotating shaft 133 and a connecting piece 136, the rotating shaft 133 is coaxially fixedly connected to the fourth gear 1312 in the second transmission assembly 13 through a first fixing member 134, so that the rotating shaft 133 can rotate synchronously with the fourth gear 1312. The rotating shaft 133 is also fixedly connected to the connecting piece 136 through a second fixing member 135, and the connecting piece 136 is fixedly connected to the second screen 15, so that when the fourth gear 1312 rotates, it can drive the second screen 15 to rotate relative to the rotating shaft 133 (that is, rotate relative to the first screen 14). In some embodiments, the connecting piece 136 can be fixedly connected to the second screen 15 through screws and other components. Similarly, when the display module also includes the third screen 16, the rotational connection mode between the third screen 16 and the first screen 14 is the same as the rotational connection mode between the second screen 15 and the first screen 14, and will not be repeated herein.

In some embodiments of the present application, the connecting piece 136 is located in the middle of the rotating shaft 133, that is, the connecting piece 136 is located at the midpoint of a connecting intersection line between the first screen 14 and the second screen 15 (third screen 16), so that the torque can be reduced, and it is easier to drive the second screen 15 (and/or the third screen 16) to unfold or fold through the rotating shaft 133. Since the connecting piece 136 is configured to be fixedly connected to the second screen 15/third screen 16 to provide support, more connecting pieces 136 can also be provided and distributed in different axial positions on the rotating shaft 133, to provide stable folding or unfolding performance.

In some embodiments, the first fixing member 134 and the second fixing member 135 may be fixing pins.

Figure 4:
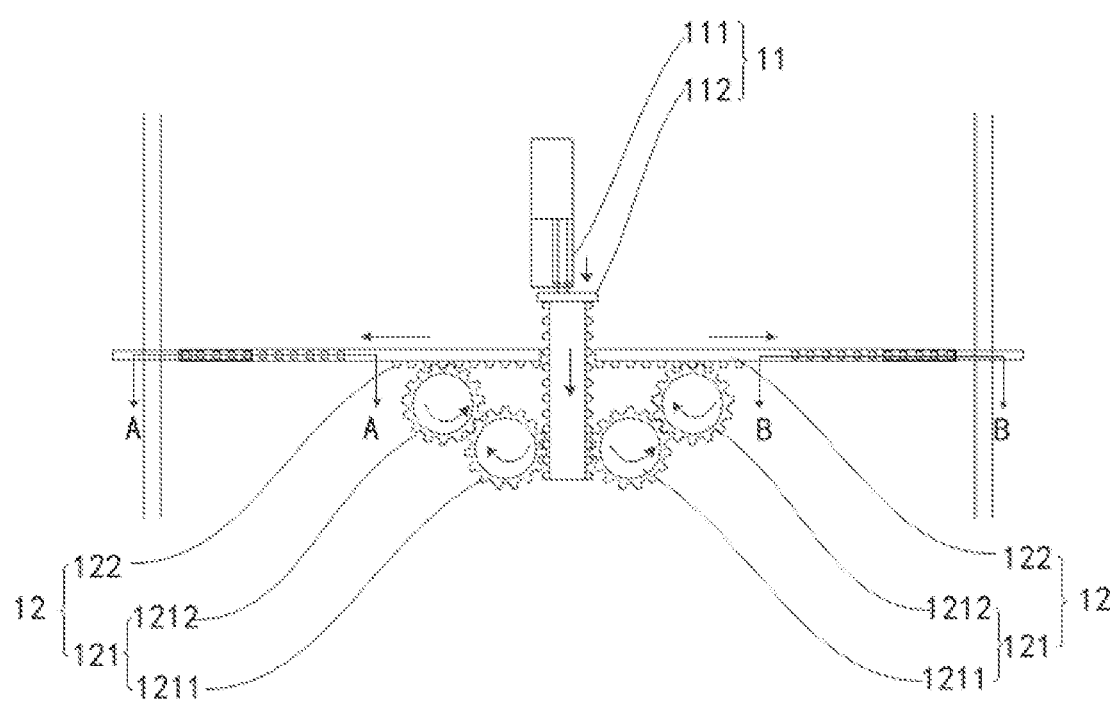
FIG. 4 is a schematic diagram of cooperation between a drive assembly and a first transmission assembly when a second screen and/or a third screen is unfolded according to an embodiment of the present application.

Referring to FIG. 4, which is a schematic diagram of cooperation between a drive assembly and a first transmission assembly when a second screen and/or a third screen is unfolded according to an embodiment of the present application. As shown in FIG. 4, for example, the display module includes the second screen 15 and the third screen 16. When the second screen 15 and the third screen 16 need to be unfolded, since the second screen 15 and the third screen 16 are symmetrically arranged relative to the first screen 14, the principle will be described below by using the right half of FIG. 4: the drive motor 111 in the drive assembly 11 starts to drive the gear push rod 112 to move along the A-A sectional line (or B-B sectional line) as indicated by the arrow pointing direction, so that the gear push rod 112 pushes, through the third meshing teeth arranged on the gear push rod, the first gear 1211 that meshes with the gear push rod, to rotate counterclockwise, so that the first gear 1211 will drive the second gear 1212 that meshes with the first gear, to rotate clockwise. Then, the second gear 1212 meshes with the first meshing teeth on the first transmission rack 122 for transmission; so that the second transmission rack 132 connected to the first transmission rack 122 moves to the right. The description of the left half of FIG. 4 is opposite to the foregoing description, and will not be repeated herein.

Figure 5:
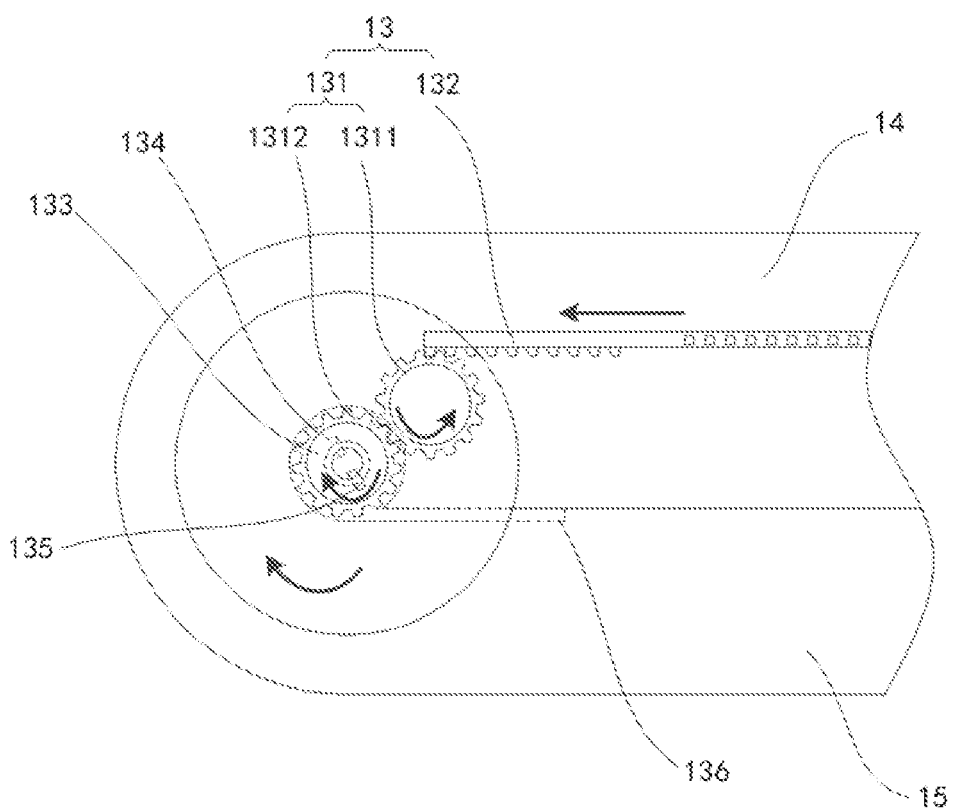
FIG. 5 is a schematic diagram of cooperation between a first transmission assembly and a second transmission assembly at A-A when a second screen is unfolded according to an embodiment of the present application.
Figure 6:
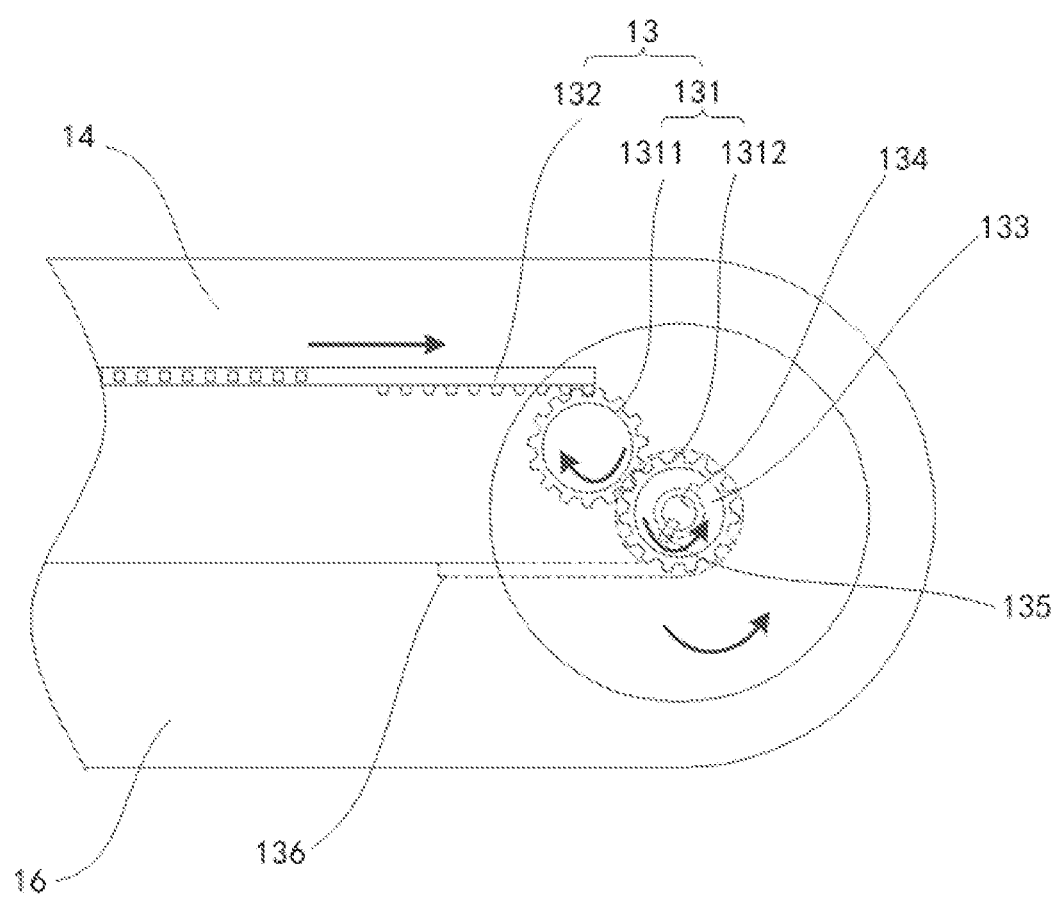
FIG. 6 is a schematic diagram of cooperation between a first transmission assembly and a second transmission assembly at B-B when a third screen is unfolded according to an embodiment of the present application.

Referring to FIG. 5 and FIG. 6, where FIG. 5 is a schematic diagram of cooperation between a first transmission assembly and a second transmission assembly at A-A when a second screen is unfolded according to an embodiment of the present application, and FIG. 6 is a schematic diagram of cooperation between a first transmission assembly and a second transmission assembly at B-B when a third screen is unfolded according to an embodiment of the present application. FIG. 6 is used as an example. The second transmission rack 132 is driven to move to the right, and therefore, the third gear 1311 that meshes with the second meshing teeth provided on the second transmission rack 132 will be driven to rotate clockwise, and the third gear 1311 will also drive the fourth gear 1312 that meshes with the third gear 1311 to rotate counterclockwise. Since the fourth gear 1312 rotating counterclockwise is coaxially fixed with the rotating shaft 133, the rotating shaft 133 will also rotate counterclockwise accordingly. Because the rotating shaft 133 is fixedly connected to the connecting piece 136 and the connecting piece 136 is also fixedly connected to the third screen 16, finally the third screen 16 will rotate counterclockwise under the drive of the rotating shaft 133, to unfold the third screen 16. The rotation direction of each component in FIG. 5 is opposite to that in the above description, and will not be repeated herein. Based on the same principle, the second screen is also unfolded.

Figure 7:
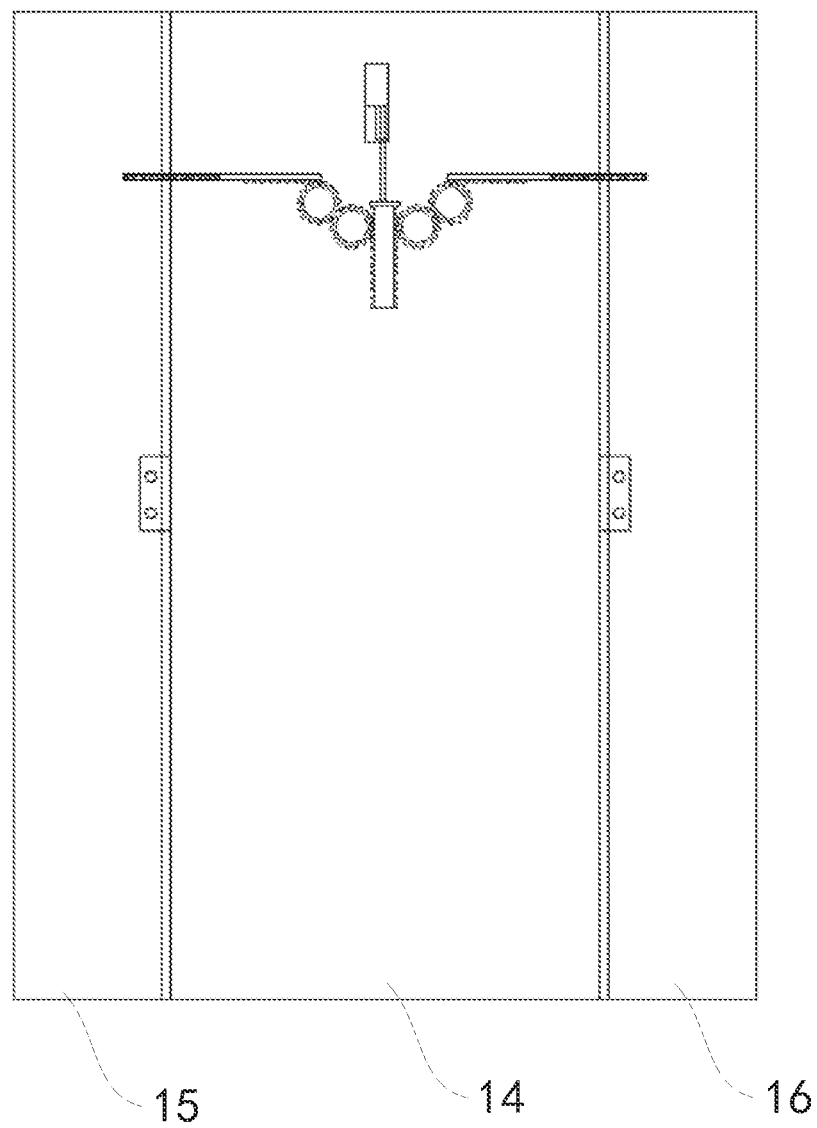
FIG. 7 is a schematic diagram in which a second screen and a third screen are unfolded according to an embodiment of the present application.

Referring to FIG. 7, which is a schematic diagram in which a second screen and a third screen are unfolded according to an embodiment of the present application. As shown in FIG. 7, when the user needs a large screen, the second screen 15 and the third screen 16 on two sides of the first screen 14 can be unfolded simultaneously to obtain a larger display area.

Figure 8:
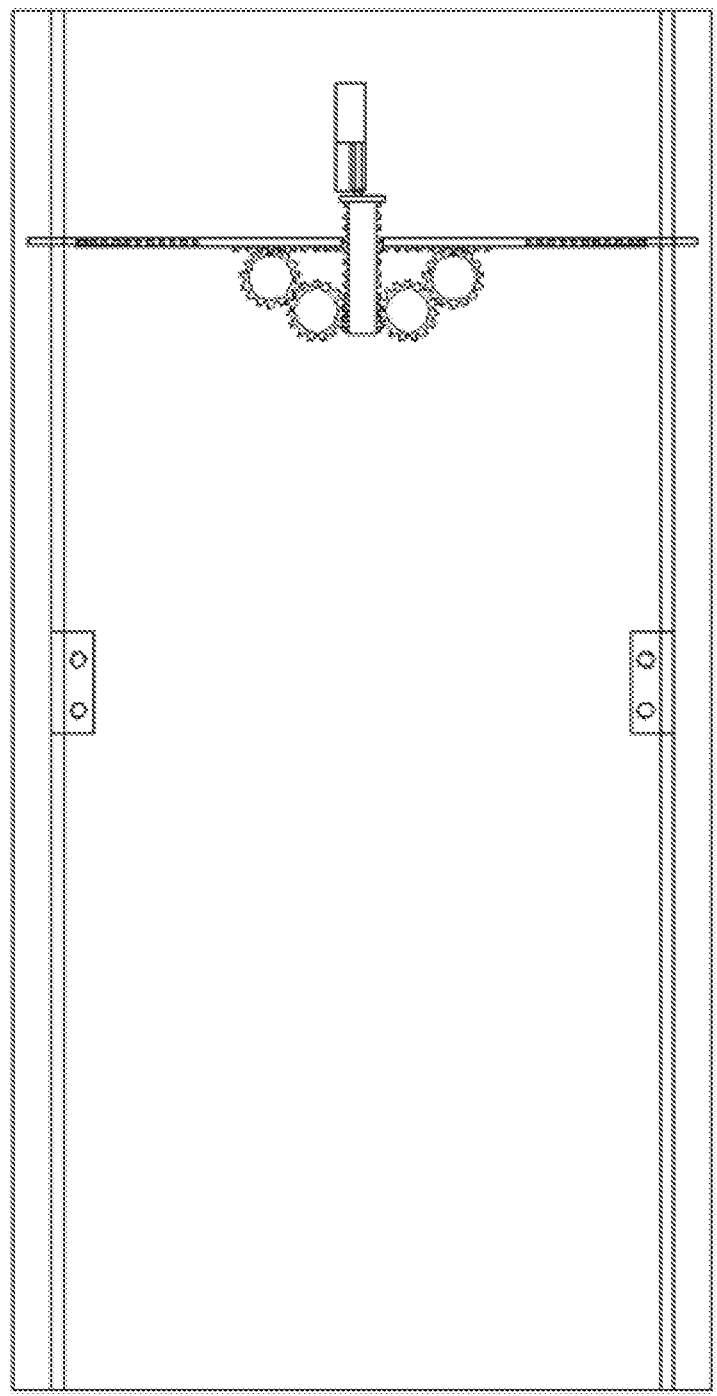
FIG. 8 is a schematic diagram in which a second screen and a third screen are folded according to an embodiment of the present application.

Referring to FIG. 8, which is a schematic diagram in which a second screen and a third screen are folded according to an embodiment of the present application. As shown in FIG. 8, when the user does not need a large screen, only the first screen 14 can be used, and the second screen 15 and the third screen 16 can be folded to the back of the first screen 14. The folding process is opposite to the above-mentioned unfolding process, and will not be described in detail herein. Therefore, it is convenient for the user to hold and operate the electronic device, and it is convenient to carry the electronic device.

Therefore, the display module in the embodiment of the present application can be freely switched between the common size screen and the large screen according to the user's needs, so that while the large-screen display can be implemented, portability and handheld operability of the electronic equipment with the display module are guaranteed, to improve the user experience.

Figure 9:
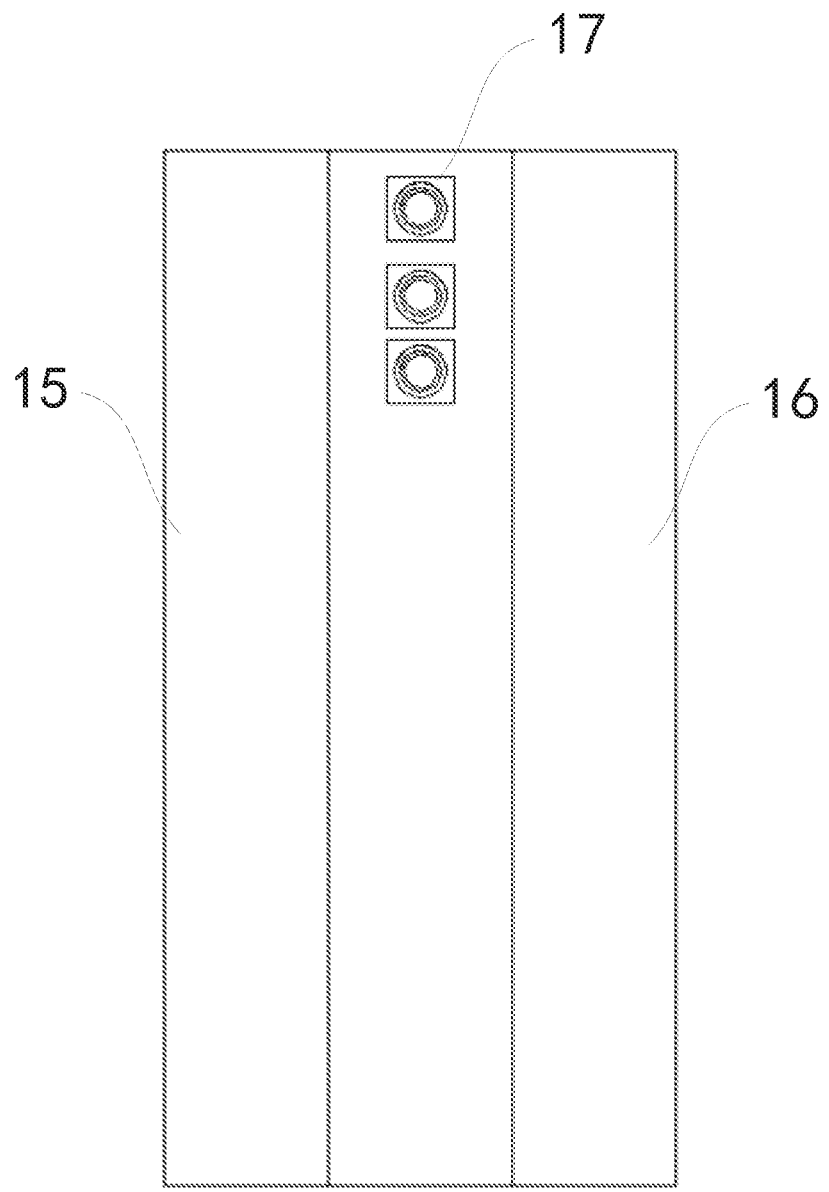
FIG. 9 is a schematic diagram of a setting method of a second screen and a third screen according to an embodiment of the present application.

Referring to FIG. 9, which is a schematic diagram of a setting method of a second screen and a third screen according to an embodiment of the present application. As shown in FIG. 9, the back of the electronic device is provided with a camera module 17, and the display module includes a second screen 15 and a third screen 16. In the case of folding, the second screen 15 and the third screen 16 can be folded on the two sides of the camera module 17, thereby avoiding the second screen 15 and the third screen 16 from blocking the camera module 17 when they are folded, so as not to affect the normal shooting function. In addition, because the camera module 17 usually protrudes from the back of the electronic device by a certain height, and the second screen 15 and the third screen 16 also increase the thickness of the electronic device after being folded on the back of the electronic device, the camera module 17 can be protected.

Figure 10:
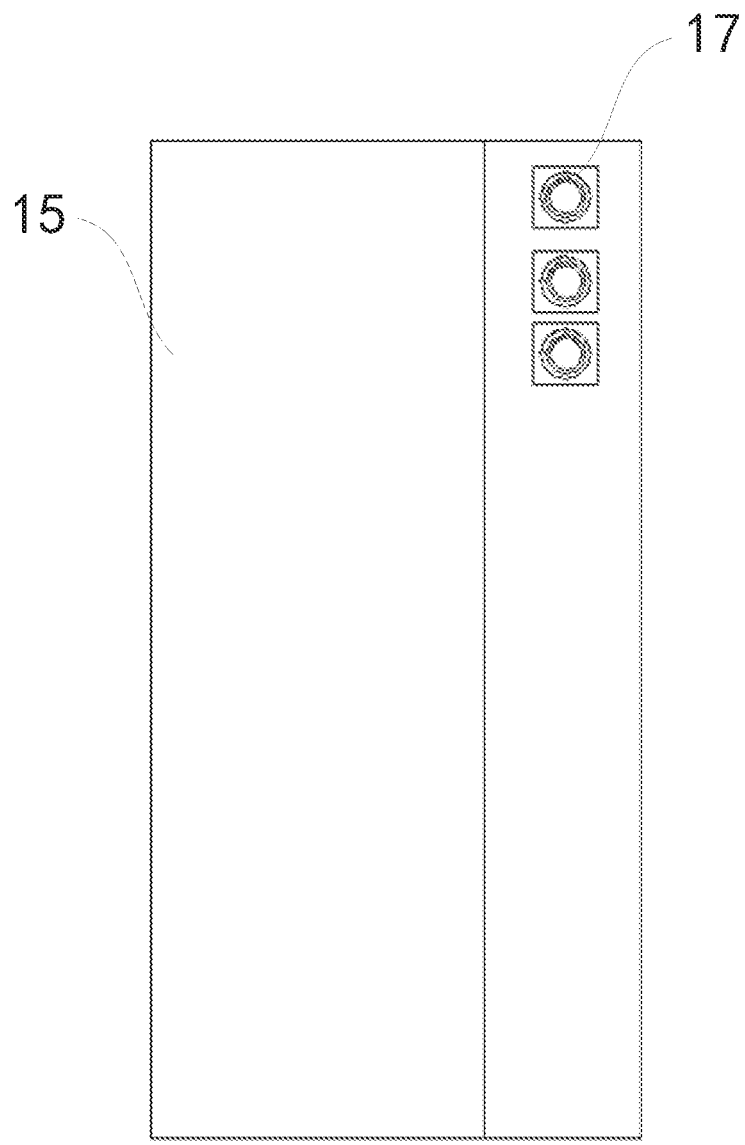
FIG. 10 is a schematic diagram of another setting manner of a second screen according to an embodiment of the present application.

Referring to FIG. 10, which is a schematic diagram of another setting manner of a second screen according to an embodiment of the present application. As shown in FIG. 10, the back of the electronic device is provided with a camera module 17, and the display module includes a second screen 15. In the case of folding, the second screen 15 can be folded on one side of the camera module 17, thereby avoiding the second screen 15 from blocking the camera module 17 when being folded, so as not to affect the normal shooting function. In addition, because the camera module 17 usually protrudes from the back of the electronic device by a certain height, and the second screen 15 also increases the thickness of the electronic device after being folded on the back of the electronic device, the camera module 17 can be protected.

According to the display module of the embodiment of the present application, the second screen and/or the third screen is automatically folded and unfolded by the folding mechanism, which ensures the consistency of the screens after each unfolding or folding, that is, surfaces of the main screen and the folding screen are on the same plane after unfolding, and the folding screen does not naturally sag and can be completely folded in place when it is folded. Moreover, since there is no need for manual operation, the folding screen can be unfolded and folded automatically, which has a strong sense of technology and improves the user experience.

Another embodiment of the present application also provides an electronic device, and the electronic device includes the display module in any one of the above embodiments. Since the display module in the above-mentioned embodiments has the above-mentioned effects, the electronic device in the embodiments of the present application also has corresponding effects, that is, the second screen and/or the third screen can be automatically folded and unfolded by the folding mechanism, which ensures the consistency of the screens after each unfolding or folding. Moreover, since there is no need for manual operation, the folding screen can be unfolded and folded automatically, which has a strong sense of technology and improves the user experience.

In the embodiment of the present application, the electronic device further includes a control module, the control module is electrically connected to the drive motor of the drive assembly, and is configured to: when the electronic device receives an input for controlling the folding screen to unfold or fold, control, according to the input, the drive motor to start, to implement the unfolding or folding of the folding screen.

In some embodiments, a control button can be arranged on the electronic device, and the control button is connected to the control module and is configured to: when receiving a control signal from the control button, control, according to the control signal, the drive motor to start, so as to implement unfolding or folding of the folding screen. By arranging the control button, it is convenient for the user to use the control button to send a control signal to the drive motor. In some embodiments, there may be one control button. When the user presses the control button once, the control module controls the drive motor to run to drive the folding screen to unfold or fold. When the user presses the control button again, the control module controls the drive motor to stop running. When the control button is pressed again, the control module can control the drive motor to run in reverse. In other embodiments, there may be multiple control buttons, and different control buttons are all connected to the control module to achieve different control functions. For example, one control button corresponds to controlling the unfolding of the folding screen, and the other control button corresponds to controlling the folding of the folding screen.

In other embodiments, the user's input for controlling the folding screen to unfold or fold can be received through the main screen of the electronic device, so that in response to the input, the control module controls the drive motor to start or stop running according to a preset control mode, to control the unfolding or folding of the folding screen. In this way, the space occupied by physical buttons can be reduced through the touch control method, and the thickness of the electronic device can be reduced.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

The embodiments of the present application are described above with reference to the accompanying drawings, but the present application is not limited to the above specific implementations, and the above specific implementations are only illustrative and not restrictive. Under the enlightenment of the present application, those of ordinary skill in the art can make many forms without departing from the purpose of the present application and the protection scope of the claims, all of which fall within the protection of the present application.

The invention claimed is:

1. A display module, comprising a first screen, a second screen, a drive assembly, a first transmission assembly, and a second transmission assembly, wherein:
    the first screen is connected to the second screen, and the first screen and the second screen are configured to rotate relative to each other;
    the first transmission assembly is at least partially connected to the first screen, the first transmission assembly comprises a first transmission gear assembly and a first transmission rack, and the first transmission rack comprises a first meshing teeth, and the first transmission gear assembly meshes with the first meshing teeth;

the second transmission assembly is at least partially connected to the second screen, the second transmission assembly comprises a second transmission gear assembly and a second transmission rack, the second transmission rack comprises a second meshing teeth, the second transmission gear assembly meshes with the second meshing teeth, and the first transmission rack is connected to the second transmission rack, wherein the first transmission gear assembly is configured to move in a first plane, and the second transmission gear assembly is configured to move in a second plane, and the first plane and the second plane are orthogonal to each other; and the drive assembly is configured to drive the first transmission gear assembly to rotate, so that the second screen rotates relative to the first screen.

2. The display module according to claim 1, wherein the drive assembly comprises a drive motor and a gear push rod, the gear push rod comprises a third meshing tooth, the drive motor is connected to the gear push rod, the first transmission gear assembly further meshes with the third meshing teeth, and the drive motor is configured to drive the gear push rod to move along a first straight line in the first plane.

3. The display module according to claim 2, wherein the first transmission gear assembly comprises a first gear and a second gear, the first gear meshes with the second gear, and the first gear further meshes with the third meshing teeth, and the second gear further meshes with the first meshing teeth.

4. The display module according to claim 1, wherein the second transmission gear assembly comprises a third gear and a fourth gear, the third gear meshes with the fourth gear, and the third gear further meshes with the second meshing teeth.

5. The display module according to claim 4, further comprising a rotating shaft and a connecting piece, wherein the rotating shaft is coaxially fixedly connected to the fourth gear through a first fixing member, the rotating shaft is fixedly connected to the connecting piece through a second fixing member, and the connecting piece is fixedly connected to the second screen.

6. The display module according to claim 1, further comprising a third screen, wherein a number of first transmission assemblies and a number of second transmission assemblies are both two, the two first transmission assemblies are both at least partially connected to the first screen, one of the second transmission assemblies is at least partially connected to the second screen, the other second transmission assembly is at least partially connected to the third screen, and the drive assembly is configured to drive the two first transmission gear assemblies to rotate, so that the second screen and the third screen rotate relative to the first screen.

7. The display module according to claim 1, further comprising a camera module, wherein the camera module is arranged on the first screen or the second screen.

8. An electronic device, comprising a display module, wherein the display module comprises a first screen, a second screen, a drive assembly, a first transmission assembly, and a second transmission assembly, wherein:

the first screen is connected to the second screen, and the first screen and the second screen are configured to rotate relative to each other;

the first transmission assembly is at least partially connected to the first screen, the first transmission assembly comprises a first transmission gear assembly and a first transmission rack, and the first transmission rack comprises a first meshing teeth, and the first transmission gear assembly meshes with the first meshing teeth;

the second transmission assembly is at least partially connected to the second screen, the second transmission assembly comprises a second transmission gear assembly and a second transmission rack, the second transmission rack comprises a second meshing teeth, the second transmission gear assembly meshes with the second meshing teeth, and the first transmission rack is connected to the second transmission rack, wherein the first transmission gear assembly is configured to move in a first plane, and the second transmission gear assembly is configured to move in a second plane, and the first plane and the second plane are orthogonal to each other; and the drive assembly is configured to drive the first transmission gear assembly to rotate, so that the second screen rotates relative to the first screen.

9. The electronic device according to claim 8, wherein the drive assembly comprises a drive motor and a gear push rod, the gear push rod comprises a third meshing tooth, the drive motor is connected to the gear push rod, the first transmission gear assembly further meshes with the third meshing teeth, and the drive motor is configured to drive the gear push rod to move along a first straight line in the first plane.

10. The electronic device according to claim 9, wherein the first transmission gear assembly comprises a first gear and a second gear, the first gear meshes with the second gear, and the first gear further meshes with the third meshing teeth, and the second gear further meshes with the first meshing teeth.

11. The electronic device according to claim 8, wherein the second transmission gear assembly comprises a third gear and a fourth gear, the third gear meshes with the fourth gear, and the third gear further meshes with the second meshing teeth.

12. The electronic device according to claim 11, wherein the display module further comprises a rotating shaft and a connecting piece, wherein the rotating shaft is coaxially fixedly connected to the fourth gear through a first fixing member, the rotating shaft is fixedly connected to the connecting piece through a second fixing member, and the connecting piece is fixedly connected to the second screen.

13. The electronic device according to claim 8, wherein the display module further comprises a third screen, wherein a number of first transmission assemblies and a number of second transmission assemblies are both two, the two first transmission assemblies are both at least partially connected to the first screen, one of the second transmission assemblies is at least partially connected to the second screen, the other second transmission assembly is at least partially connected to the third screen, and the drive assembly is configured to drive the two first transmission gear assemblies to rotate, so that the second screen and the third screen rotate relative to the first screen.

14. The electronic device according to claim 8, wherein the display module further comprises a camera module, wherein the camera module is arranged on the first screen or the second screen.

* * * * *